Dec. 22, 1964   M. W. LOVELAND   3,162,223
OLIVE PITTER HAVING PIT AND FRUIT DISLODGING JETS
Filed April 1, 1963   3 Sheets-Sheet 1

INVENTOR.
MALCOLM W. LOVELAND
BY
ATTORNEYS

Dec. 22, 1964   M. W. LOVELAND   3,162,223
OLIVE PITTER HAVING PIT AND FRUIT DISLODGING JETS
Filed April 1, 1963   3 Sheets-Sheet 2

INVENTOR.
MALCOLM W. LOVELAND
BY
ATTORNEYS

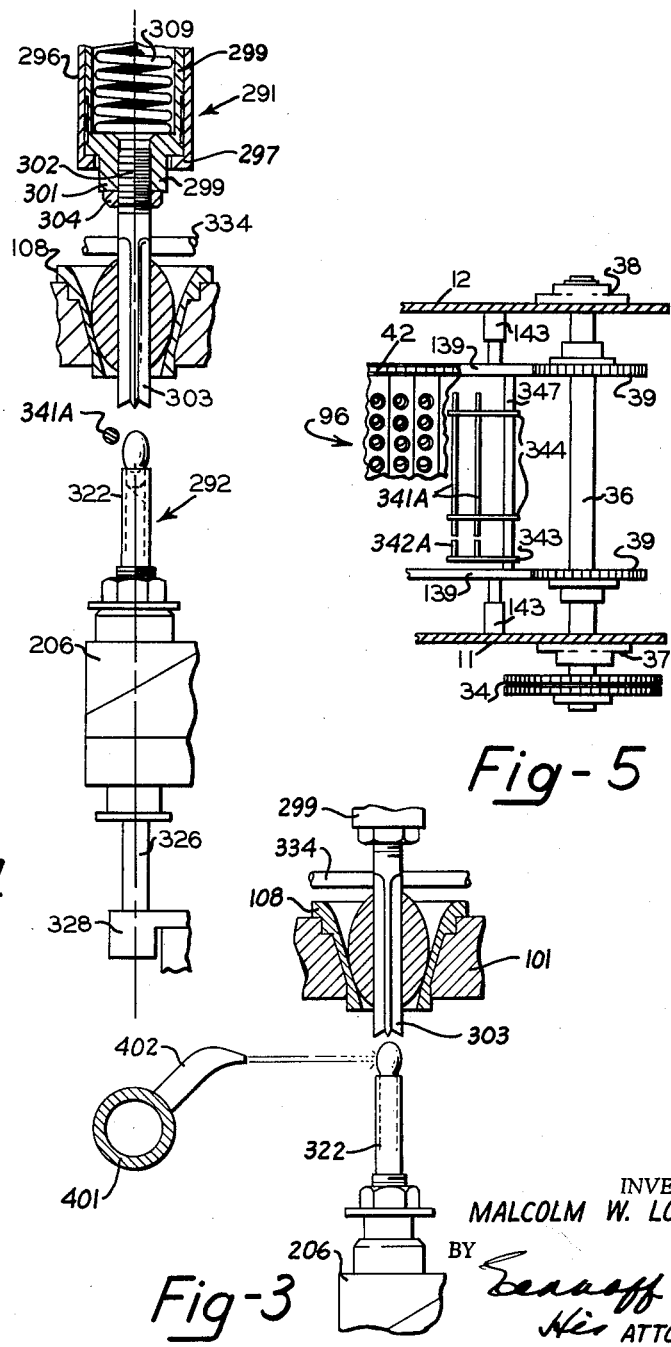

United States Patent Office 3,162,223
Patented Dec. 22, 1964

3,162,223
OLIVE PITTER HAVING PIT AND FRUIT DISLODGING JETS
Malcolm W. Loveland, Orinda, Calif., assignor to Atlas Pacific Engineering Company, a corporation of California
Filed Apr. 1, 1963, Ser. No. 269,471
2 Claims. (Cl. 146—27)

This is a continuation-in-part of my co-pending application Serial No. 125,785, filed July 21, 1961, now abandoned and which relates to a fruit pitting machine particularly adapted to the pitting of fruit such as olives, dates, prunes, plums and the like. In that machine, an opposed pitting plunger and coring knife are advanced in such fashion that the pit in the fruit is pushed out through the opening provided by the cutting of a core by the coring knife.

The pitting of a fruit is accomplished with great rapidity, each cooperating pair of pitting plunger and coring knives coring and pitting some 150 to 200 separate fruits per minute. One of the problems provided by such a rapid operation of the fruit pitting machine is that of ensuring that the pit, with or without its attached core, is removed and is discharged and does not become mixed with the pitted fruit or returned into the cavity in the fruit. Both these happenings are possible and both are highly objectionable. For example, if the pit and its attached core becomes mixed with the fruit it makes the packaged fruit unsightly. If the pit is returned to the fruit, it may be hidden within the fruit, thus providing a potential source of liability for the fruit packer.

It is a generally broad object of the present invention to provide an improved fruit pitting machine in which means are provided for ensuring the removal of the pit and core from the pitting mechanism.

A further object of the present invention is to provide pitted core removal means capable of operating efficiently and effectively when the fruit pitting machine is operated at a relatively high rate.

The invention includes other objects and features of advantage, some of which, together with the foregoing, will appear hereinafter wherein the present preferred embodiment of the invention is disclosed. In the drawing accompanying and forming a part hereof, FIGURE 1 is a side elevation partly in section showing one embodiment of the machine of the present invention.

FIGURES 3 and 4 are generally schematic views showing the apparatus of FIGURES 1 and 2 in operation.

FIGURE 4 is a schematic view showing the apparatus of FIGURE 2 in operation.

FIGURE 5 is a partial plan view showing how the mechanism of FIGURE 2 is installed in the machine.

Figure 1:
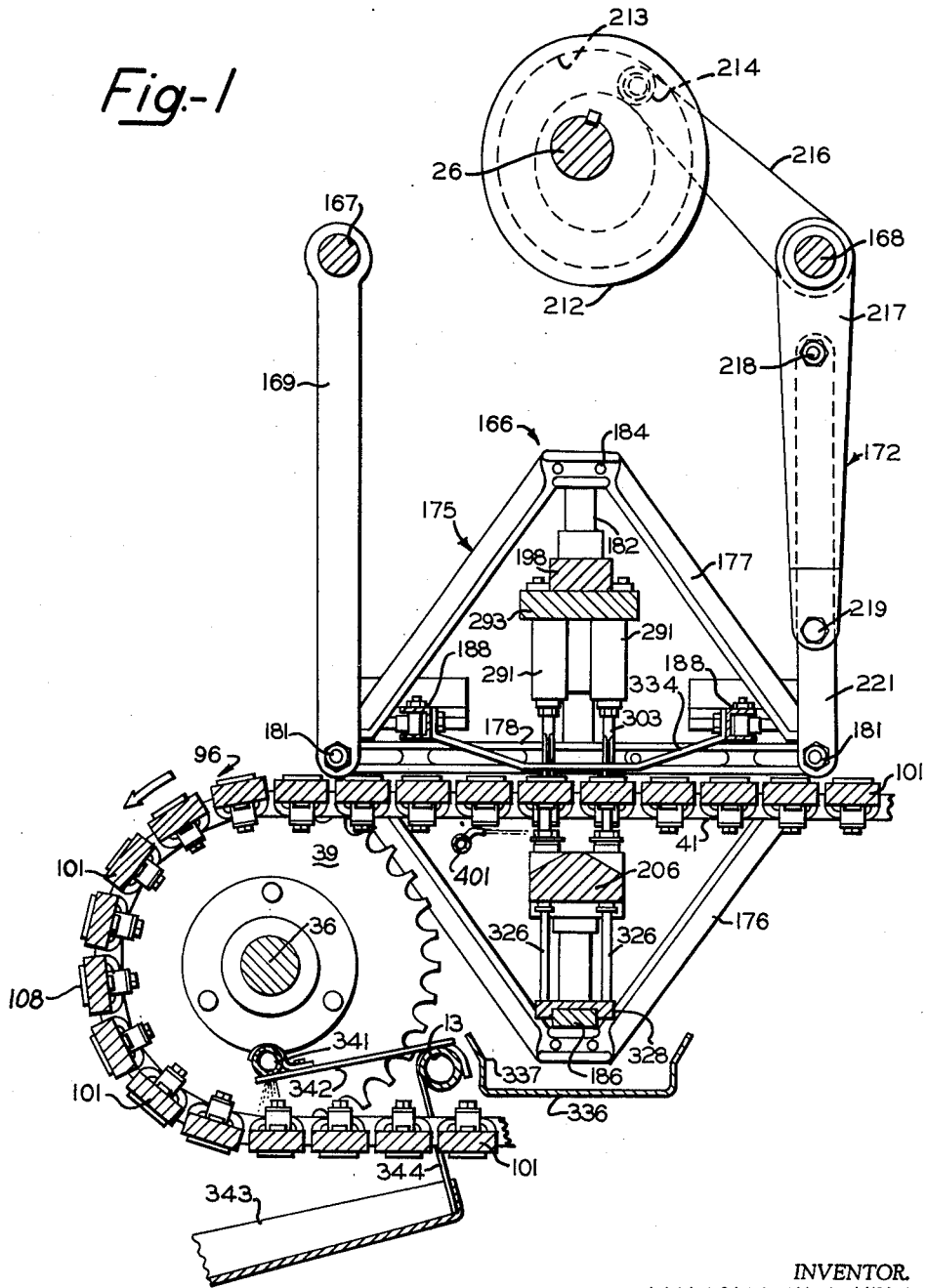

The machine shown is generally like that disclosed in my aforementioned co-pending application and the reference numerals applied herein are as used in that application.

The pitting mechanism is generally indicated at 166 and includes a side frame 175, there being two of these upon opposite sides of the machine. Each of the side frames 175 includes a lower V-shaped element 176, an upper inverted V-shaped element 177 and a centrally positioned cross-bar 178. These are provided with holes at their opposite ends for receiving fittings 181 for pivotal attachment of support member 169 and bell crank 172. Support member 169 is mounted upon the shaft 167 while bell crank 172 is mounted on shaft 168.

Mounted for travel beneath the pitting mechanism 166 is a conveyor assembly generally indicated at 96 and including a plurality of cup bars 101 extended between opposite chains 41 which are supported on horizontal side rails 139 and trained about the sprockets 39 provided upon opposite sides of the machine. Rails 139 are supported from the main frame plates 11 and 12 by spaces 143. As is shown in FIGURE 5, the sprockets are carried upon a shaft 36 extended between the side frame members 11 and 12 of the machine, shaft 36 being mounted in bearing 37 and 38 and being driven by a chain trained about the drive sprockets 34 secured at one end of the shaft 36.

To permit of precise angular adjustment of the pitting mechanism into parallelism with the cup bars 101, extension 221 is attached by bolt 218 and an eccentric fitting 219 to the lower leg 217 of bell crank 172. The support 172 is made up of the lower leg 217 of a bell crank.

For rocking the pitting mechanism back and forth over the conveyor over a predetermined path, cams 212 are mounted upon a shaft 26, the latter being suitably rotated by means not shown. Each cam 212 includes a cam track 213 in which a roller 214 rides, the roller being provided on upper leg 216 of bell crank 172.

The pitting mechanism is carried on vertical guide rod members 182 mounted in the middle of each frame 175. Slidably mounted on the upper portion of each rod 182 is a sleeve fitting not shown which carries the transverse cross-bar 198. This cross-bar carries plate 293 to which the punch assemblies 291 are attached. Each punch assembly includes a punch 303.

A pair of channels 188 are extended transversely across the cross-bars 178 to complete the carriage structure. Stripper rods 334 extend between the channels 188 to strip off fruit adhering to a punch when these are retracted from the fruit, as will appear.

The transverse cross-bar member 186 is bolted to the bottom end of a rod not shown to interconnect the bottom portions of the side frames. Also, suitably slidably mounted on the rods 182 are means supporting the transverse member 206 on which the cooperating coring knife and core ejector assemblies 292 are mounted. Each assembly includes a coring knife 322 and a cooperating core ejector 326, the latter being supported by member 328 attached to cross-bar 186.

Figure 2:
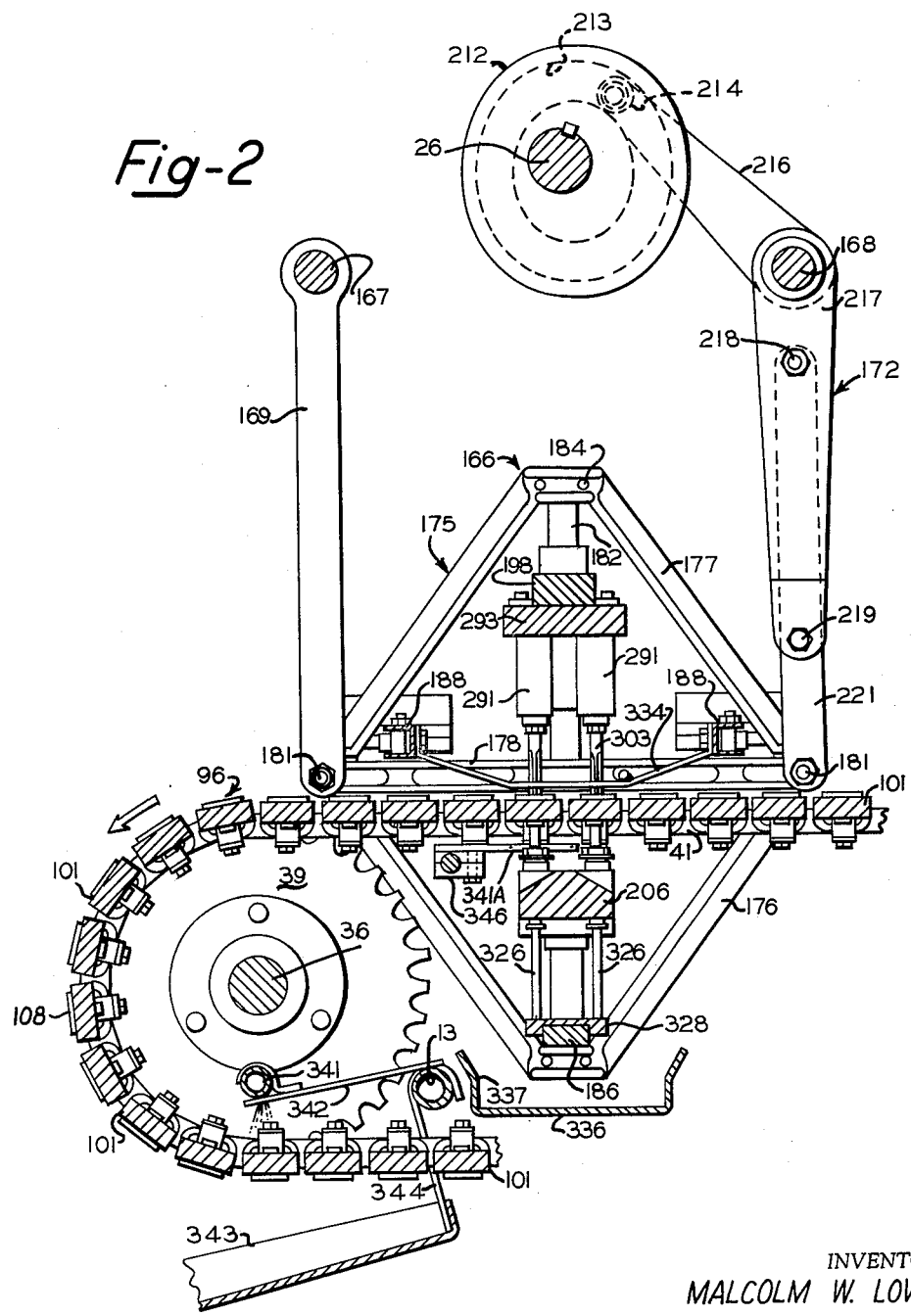
FIGURE 2 is a side elevation partly in section showing another embodiment of the machine of the present invention.

Referring particularly to FIGURES 2, 4 and 5, means are provided for removing a pit adhering to a punch 303 or projecting beyond the upper end of a coring knife 322. This means includes rods 341–A and 342–A which project transversely of the machine at a suitable elevation to engage and displace a pit riding on the top end of the coring knife 322 as appears in FIGURE 4 or adhering to the punch 303. The rods are provided in such a location that the pit and core have been removed from the fruit and the punch and core knife are separated so that the rod can pass between them as the pitting head 166 completes its forward motion.

Rods 342–A are supported by a a cantilever arm 343 while rods 341–A are supported by cantilever arms 344. The arms are secured by a clamp structure 346 (FIGURE 2) to a rod 347 which extends conversely across the machines.

Each punch assembly includes (FIGS. 3 and 4) a housing 296, having a lower end portion 297 of reduced internal diameter. A sleeve 299 is mounted in the housing with its end 301 threaded as at 302 to receive the threaded end of punch 303, the latter being locked in place by lock nut 304. A compressing spring 309 is provided within the sleeve 299. This spring is one which requires substantial pressure application to move it in the housing, it being the purpose of the spring to safeguard the punch 303. Normally, with fruit having a pit of normal length and correctly positioned in a chuck 108, the spring is not compressed during the machine operation.

In operation, fruit is carried forward from a feeding hopper to the pitting station between the side walls of the frame structure by conveyor assembly 96. Each fruit is quickly and accurately aligned in a chuck by the vibratory movement imparted to the conveyor 96 by means not shown. The oscillating movement of the pitting mechanism 166, including the pitting punches, coring knives and ejectors, comprises movement of the pitting mechanism from a rear position at an accelerated rate to a synchronized movement with the conveyor over approximately 180° of rotation of the cams 212, followed by deceleration and return of the pitting mechanism 166 to a rear position at a rate greater than the rate of forward motion.

The conveyor assembly usually moves forward at a constant rate, specifically two carrier bars per cycle in the machine shown. Since the pitting mechanism provides for pitting two adjacent rows of fruit, the pitting mechanism moves forward at a distance approximately equal to the width of a single carrier bar during pitting. The return motion of the pitting mechanism is accomplished during the forward travel of one carrier bar, thus, bringing two more rows of fruit into position for pitting.

In the machine shown, the pitting plunger and coring knife are suitably moved to engage the fruit and eject the pit and core from the fruit. FIGURE 4 shows the relative position of the coring knife 322 and the pitting plunger 303 after these have separated, the pit resting on the top of the coring knife and the core being within the coring tube 322. In accordance with this invention, the rods 341-A and 342-A engage and dislodge the pit. This engagement may serve to dislodge the pit and its attached core from the coring knife or it may serve only to break the pit away from the core which is subsequently ejected by movement of the coring ejector rod 326. If the pit remains embedded on the end of the punch 303, it will also engage one of the rods 341-A or 342-A and so be displaced. In any event, assurance is given that the pit and its attached core will not find their way back into the fruit but instead will fall onto the transverse trough 336 having sloping sides 337. The trough 336 is installed between the side plates directly under the bottom portion of the pitting mechanism to receive pits and cores. Normally, the trough 336 is flushed with water to remove the pits and cores.

The pitted fruit is ejected into an inclined trough 343, the latter being supported by integral hook elements 344 which extend over a spacer tube 13 provided between the side walls of the machine. Any fruit remaining in the chucks after the latter have passed substantially about the sprocket 39 are removed by water spray from manifold 341, the latter being supported on arms 342 from the spacer tube 13.

In that form of the invention shown in FIGURES 1, 3 and 4, a manifold 401 is extended between the side plates 11 and 12. The manifold is provided with a jet nozzle 402 opposite each cooperating punch and knife. The nozzle provides a continuous stream of water or other suitable liquid in the path of the forward travel of the pitting punch and the coring knife under a pressure of 40 pounds and more per square inch. This forceful ejection of the fluid serves to remove the pit from either the plunger or the coring knife. The jet can operate continuously or it can operate in time with the pitting mechanism 166 to let forth a blast of liquid at the right moment. The jet has the advantage that it is not subject to physical displacement or damage as are the rods 341-A and 342-A as may occur when the machine is operating very rapidly.

From the foregoing, I believe it will be apparent that I have provided novel, simple and improved devices for ensuring that pit and cores from pitted fruit will not be returned into the friut or become mixed with the fruit.

I claim:

1. In an olive pitting machine having an endless conveyor trained about vertically disposed rotatable sprockets, said sprockets being spaced in a horizontal plane whereby said conveyor is moved horizontally during a major portion of its path of travel and wherein said conveyor supports a plurality of open-ended olive-holding chucks, each chuck being mounted for support in an upright orientation during a first portion of the horizontal movement of the said conveyor in which the longitudinal axes of said olives extend vertically, said chucks being inverted during a second horizontal portion of the said conveyor travel, the improvements comprising:

(a) a pitting station positioned adjacent the conveyor at a point where said conveyor is in said first horizontal movement portion with the said chucks upright, said pitting station including a punch and coring knife mounted coaxially respectively above and below the said conveyor;

(b) means for moving the punch and coring knife back and forth substantially horizontally and parallel to the path of travel of said conveyor at the said pitting station;

(c) means for moving the punch and coring knife toward said conveyor and toward one another during their said parallel movement at the said pitting station and thereafter in the same direction to cut a core into an olive to the pit of the said olive and then to force the pit and core downwardly and out of the olive;

(d) means for then moving the coring knife and punch apart while said knife and punch are moving substantially horizontally in the direction of movement of the said conveyor;

(e) means mounted adjacent said pitting station and at a spot where the said conveyor traverses said first horizontal portion of its path of travel, said means being capable of ejecting a liquid stream horizontally and directed immediately below the said conveyor at a spot normally occupied by a pit on the tip of the said coring knife following removal of the pit from the said olive;

(f) means for supplying liquid to the said stream ejecting means immediately after said coring knife and said punch have dislodged a pit from an olive;

(g) means positioned adjacent the path of conveyor travel at a point subsequent to said point where said conveyor traverses said first horizontal portion of the said path of travel for dislodging the said olive from a chuck while the said chuck is substantially inverted, said means comprising apparatus for directing a liquid jet downwardly at the inverted bottom of the said chuck as the said chuck passes adjacent the said means whereby to dislodge an olive from the said chuck; and (h) means for supplying liquid to the said jet means at such time as the chuck passes adjacent to said means.

2. In an olive pitting machine having an endless conveyor trained about vertically disposed rotatable sprockets, said sprockets being spaced in a horizontal plane whereby said conveyor is moved horizontally during a major portion of its path of travel and wherein said conveyor supports a plurality of open-ended olive-holding chucks, each chuck being mounted for support in upright orientation during a first portion of the horizontal movement of the said conveyor in which the longitudinal axes of said olives extend vertically, the improvement comprising:

(a) a pitting station positioned adjacent the conveyor at a point where said conveyor is in said first horizontal movement portion with the said chucks upright, said pitting station including a punch and coring knife mounted coaxially respectively above and below the said conveyor;

(b) means for moving the punch and coring knife back and forth substantially horizontally and parallel to the path of travel of said conveyor at the said pitting station;

(c) means for moving the punch and coring knife toward said conveyor and toward one another during their said parallel movement at the said pitting station to cut a core into an olive to the pit of the said olive and thereafter in the same direction downwardly to force the pit and core out of the olive with the punch extending below the pitted olive;

(d) means for then moving the coring knife and punch apart while said knife and punch are moving substantially horizontally in the direction of movement of the said conveyor;

(e) and means for ejecting a liquid stream with sufficient force to dislodge a pit ejected from a cored olive by the downward movement of the punch and coring knife, said stream being directed at the space between the terminal ends of the punch and coring knife and said stream being ejected in a direction parallel to the back and forth path of travel of the punch and knife.

References Cited in the file of this patent

UNITED STATES PATENTS

| | | |
|---|---|---|
| 2,205,397 | Drake | June 25, 1940 |
| 2,407,126 | Ashlock | Sept. 3, 1946 |
| 2,821,223 | Kagley et al. | Jan. 28, 1958 |